sure Bulletin, vol. 7, No. 7, (1 page) (Dec. 1964).
United States Patent [19]
Umezawa

[11] Patent Number: 4,975,766
[45] Date of Patent: Dec. 4, 1990

[54] STRUCTURE FOR TEMPERATURE DETECTION IN A PACKAGE

[75] Inventor: Kazuhiko Umezawa, Tokyo, Japan
[73] Assignee: NEC Corporation, Tokyo, Japan
[21] Appl. No.: 397,233
[22] Filed: Aug. 23, 1989
[30] Foreign Application Priority Data Aug. 26, 1988 [JP] Japan ................................ 63-211660
Jan. 11, 1989 [JP] Japan ................................ 1-5128

[51] Int. Cl.⁵ ............................................ H01L 23/02
[52] U.S. Cl. ...................................... 357/81; 357/80; 357/82
[58] Field of Search ....................... 357/81, 82, 70, 72, 357/74, 80

[56] References Cited
U.S. PATENT DOCUMENTS

| | | | |
|---|---|---|---|
| 2,357,706 | 9/1944 | Toepperwein | 156/80 |
| 2,783,418 | 2/1957 | Peter et al. | 357/82 |
| 2,999,034 | 9/1961 | Heidenhain | 427/167 |
| 3,205,469 | 9/1965 | Frank et al. | 439/48 |
| 3,211,969 | 10/1965 | Colaiaco | 357/82 |
| 3,651,865 | 3/1972 | Feldmanis | 165/80.4 |
| 3,777,220 | 12/1973 | Tatusko et al. | 361/409 |
| 3,827,457 | 8/1974 | Vutz et al. | 137/599 |
| 3,881,181 | 4/1975 | Khajezadeh | 357/82 |
| 3,908,188 | 9/1975 | Kawamoto | 357/82 |
| 3,912,001 | 10/1975 | Missman et al. | 165/80.4 |
| 3,993,123 | 11/1976 | Chu et al. | 165/80.3 |
| 4,037,270 | 7/1977 | Ahmann et al. | 361/385 |
| 4,093,971 | 6/1978 | Chu et al. | 361/382 |
| 4,109,707 | 8/1978 | Wilson | 165/46 |
| 4,110,549 | 8/1978 | Goetzke et al. | 174/16.3 |
| 4,115,836 | 9/1978 | Hutchison et al. | 361/382 |
| 4,158,875 | 6/1979 | Tajima et al. | 361/384 |
| 4,196,775 | 4/1980 | Groh | 165/68 |
| 4,204,246 | 5/1980 | Arii et al. | 361/385 |
| 4,245,273 | 1/1981 | Feinberg et al. | 361/382 |
| 4,282,924 | 8/1981 | Faretra | 118/500 |
| 4,381,032 | 4/1983 | Cutchaw | 165/46 |
| 4,398,208 | 8/1983 | Murano et al. | 357/81 |
| 4,439,918 | 4/1984 | Carroll et al. | 29/840 |
| 4,467,522 | 8/1984 | Marchisi | 29/827 |
| 4,468,717 | 8/1984 | Mathias et al. | 361/382 |
| 4,493,010 | 1/1985 | Morrison et al. | 361/385 |
| 4,498,122 | 2/1985 | Rainal | 361/414 |
| 4,509,096 | 4/1985 | Baldwin et al. | 361/386 |

(List continued on next page.)

FOREIGN PATENT DOCUMENTS

| | | | |
|---|---|---|---|
| 55-86130 | 6/1980 | Japan . | |
| 56-70655 | 6/1981 | Japan . | |
| 57-106062 | 7/1982 | Japan . | |
| 59-130450 | 7/1984 | Japan . | |
| 60-160150 | 8/1985 | Japan . | |
| 60-257156 | 12/1985 | Japan . | |
| 61-0171157 | 8/1986 | Japan | 357/81 |
| 61-226946 | 10/1986 | Japan . | |
| 61-276242 | 12/1986 | Japan | 357/82 |
| 63-81959 | 4/1988 | Japan . | |
| 63-226049 | 9/1988 | Japan . | |
| 63-308943 | 12/1988 | Japan | 357/81 |
| 572951 | 9/1977 | U.S.S.R. . | |

OTHER PUBLICATIONS

"Module Package", Dion et al., IBM Technical Disclosure Bulletin, vol. 7, No. 7, (1 page) (Dec. 1964).
IBM Technical Disclosure Bulletin, vol. 20, No. 11A, (List continued on next page.)

Primary Examiner—Rolf Hille
Assistant Examiner—Hoanganh Le
Attorney, Agent, or Firm—Burns, Doane, Swecker & Mathis

[57] ABSTRACT

A structure for detecting a temperature of a package which includes a circuit board having mounted thereon a plurality of integrated circuit chips, each of which is accommodated in a chip carrier, a cooling plate facing the integrated circuit chips for performing a heat exchanger with a coolant, a temperature sensing block including a case which is mounted on the circuit board and has substantially the same height as the chip carriers with at least one temperature sensor accommodated in the case, and a heat-conducting medium filling small clearances defined between the cold plate and the integrated circuit chips and the temperature sensing block.

5 Claims, 5 Drawing Sheets

U.S. PATENT DOCUMENTS

| | | | |
|---|---|---|---|
| 4,535,385 | 8/1985 | August et al. | 361/388 |
| 4,536,824 | 8/1985 | Barrett et al. | 361/384 |
| 4,546,410 | 10/1985 | Kaufman | 361/387 |
| 4,574,879 | 3/1986 | DeGree et al. | 165/185 |
| 4,588,023 | 5/1986 | Munekawa | 165/104.33 |
| 4,602,125 | 7/1986 | West et al. | 174/138 G |
| 4,602,678 | 7/1986 | Fick | 165/79 |
| 4,628,990 | 12/1986 | Hagihara et al. | 165/80.4 |
| 4,641,176 | 2/1987 | Keryhuel et al. | 357/74 |
| 4,644,385 | 2/1987 | Nakanishi et al. | 357/82 |
| 4,666,545 | 5/1987 | DeGree et al. | 156/252 |
| 4,685,211 | 8/1987 | Hagihara et al. | 29/832 |
| 4,686,606 | 8/1987 | Yamada et al. | 361/385 |
| 4,689,659 | 8/1987 | Watanabe | 357/81 |
| 4,712,158 | 12/1987 | Kikuchi et al. | 361/385 |
| 4,721,996 | 1/1988 | Tustaniwskyj et al. | 357/82 |
| 4,724,611 | 2/1988 | Hagihara | 29/480 |
| 4,727,554 | 2/1988 | Watanabe | 357/81 |
| 4,729,424 | 3/1988 | Mizuno et al. | 357/82 |
| 4,744,007 | 5/1988 | Watari et al. | 361/386 |
| 4,748,495 | 5/1988 | Kucharek | 357/82 |
| 4,750,086 | 6/1988 | Mittal | 361/382 |
| 4,768,352 | 9/1988 | Maruyama | 62/383 |
| 4,781,244 | 11/1988 | Kuramitsu et al. | 165/80.4 |
| 4,783,721 | 11/1988 | Yamamoto et al. | 361/382 |
| 4,791,983 | 12/1988 | Nicol et al. | 165/80.4 |
| 4,794,981 | 1/1989 | Mizuno | 165/80.4 |
| 4,884,167 | 11/1989 | Mine | 361/382 |

OTHER PUBLICATIONS

Apr. 1978, "Three-Dimensional MLC Substrate Integrated Circuit Support Package", Aichelmann et al., pp. 4349 and 4350.

IBM Technical Disclosure Bulletin, vol. 20, No. 11A, Apr. 1978, "Conduction-Cooling Module", Hwang et al., pp. 4334-4335.

IBM Technical Disclosure Bulletin, vol. 21, No. 6, (Nov. 1978), "Compliant Cold Plate Cooling Scheme", Antonetti et al., p. 2431.

IBM Technical Disclosure Bulletin, vol. 21, No. 6, Nov. 1978, "Solid Encapsulated Module", Chu et al., pp. 2435-2436.

Forward and Introduction of IEEE International Conference on Computer Design: VLSI in Computers; ICCD '83 Session: The New IBM 4381, 3 pages (Nov. 1, 1983).

IBM J. Res. Develop., vol. 26, No. 1, pp. 55-66, (Jan. 1982), "A Conduction-Cooled Module for High-Performance LSI Devices", Oktay, et al.

Electronics, "Supercomputers Demand Innovation in Packaging and Cooling", Lyman, pp. 136-144, Sep. 22, 1982.

IBM Technical Disclosure Bulletin, "Counter-Flow Cooling System", Chu, vol. 8, No. 11, Apr. 1966, p. 1692.

IBM Technical Disclosure Bulletin, vol. 18, No. 12, pp. 3982-3983, "Heat-Pipe Cooled Stacked Electronic Wafer Package", Kerjilian et al., May 1976.

IBM Technical Disclosure Bulletin, vol. 20, No. 4, Sep. 1977, "Method of Effective Cooling of a High Power Silicon Chip", Doo et al., pp. 1436-1437.

Microelectronics, Scientific American, published 1977 by W. H. Freemand and Company, San Francisco, cover page, pp. 51, 166.

Assembly Techniques, pp. 404-420, understood to be from the book Integrated Circuit Engineering, publishing date not known.

IEEE Transactions on Components, Hybrids and Manufacturing Technology, vol. CHMT-2, No. 3, Sep. 1977, "Bumped Tape Automated Bonding (BTAB) Practical Application Guidelines", Kanz et al., pp. 301-308.

IEEE Transactions on Components, Hybrids, and Manufacturing Tech., vol. CHMT-3, No. 1, Mar. 1980, "IBM Multichip Multilayer Ceramic Modules for LSI Chips—Design for Performance and Density", Clark, et al., pp. 89-93.

IEEE International Conference on Computer Design: VLSI in Computers ICCD '83 Session: The New IBM 4381, "New Internal and External Cooling Enhancements for the Air-Cooled IBM 4381 Module", Oktay et al., 4 pages (Nov. 1, 1983).

IEEE International Conference on Computer Design: VLSI in Computers ICCD '83 Session: The New IBM 4381, "Electrical Design and Analysis of the Air-Cooled Module (ACM) in IBM System/4381", Cherensky et al., 6 pages (Nov. 1, 1983).

IEEE International Conference on Computer Design: VLSI in Computers ICCD '83 Session: The New IBM 4381, "Hermetic Tin/Lead Solder Sealing for the Air-Cooled IBM 4381 Module", Brady et al., 4 pages (Nov. 1, 1983).

STRUCTURE FOR TEMPERATURE DETECTION IN A PACKAGE

BACKGROUND OF THE INVENTION

The invention relates to a structure for detecting the temperature of a package having a substrate mounting a plurality of integrated circuit (IC) chips.

Generally, a data processor or similar electronic apparatus has a plurality of substrates each mounting a number of IC chips. The substrates are mounted on a rack and cooled forcibly by fans attached to the rack. With this kind of apparatus, it has been customary to sense the temperature of the exhaust stream continuously and, on the elevation of the temperature beyond a predetermined value, take a suitable measure against the damage to the IC chips, for instance, interruption of power supply to the apparatus.

Today, the density of heat generation in a rack is extremely high due to the large scale integration and dense arrangement of IC chips. With an apparatus of this kind, therefore, it is a common practice to use IC packages cooled by liquid. Specifically, a temperature sensor is provided in each of IC packages to sense the temperature thereof. When the temperature of an IC package exceeds a predetermined value, a protective measure such as the interruption of power supply is taken.

FIG. 1 shows a prior art structure for sensing a package temperature. As shown, an IC package 302 is mounted on a substrate 301 and formed with a narrow channel 303. A temperature sensor 304 is received in the channel 303 and connected to a flexible print board 305. The print board 305 is reinforced by a plate 307. A connector 306 is connected to the plate 307 for leading the output of the temperature sensor 304 to the outside of the package 302. The components 304 to 307 so far described constitute a subassembly, as shown in a perspective view in FIG. 2. A cooling plate 310 has an inlet 308 and an outlet 309 for a coolant and is fastened to the IC package 302 by screws 311. A coolant is circulated through the inlet 308 and the outlet 309 to cool the IC package 302. A cable connector 312 is connected to the connector 306. The output signal of the temperature sensor 304 is led out by the connector 306 and the cable connector 312 to monitor the temperature of the IC package 302.

The prior art structure described above has a disadvantage in that a part of the flexible print board 305, the plate 307 and the connector 306, which constitute a part of the signal path for leading out the sensor output, protrude from the IC package 302. Such a protuberance is apt to hit against various objects when the IC package 302 is mounted, dismounted or transported, damaging the structural components which form the signal path.

The IC package 302 is removed from the substrate 301 with the cable connector 312 being held in connection with the connector 306. This often damages the connector 312 as well as the components of the signal path. Further, there is a possibility that when the cold plate 310 is brought into engagement with the IC package 302 and the cable of the cable connector 312 is sandwiched therebetween, a cutting of the cable may result.

SUMMARY OF THE INVENTION

An object of the invention is, therefore, to provide a structure for detecting a temperature of an IC package free from the above-mentioned disadvantages of the prior art.

According to an aspect of the invention, there is provided a structure for sensing a temperature of a package which comprises: a circuit board mounting a plurality of IC chips, each of which is accommodated in a chip carrier; a cold plate facing the IC chips at a small distance from the IC chips for performing heat exchange with a coolant; a temperature sensing block including a case which is mounted on the circuit board and has the same height as the chip carriers, and at least one temperature sensor accommodated in the case; and a heat-conducting medium filling small clearances defined between the cold plate and the IC chips and the temperature sensing block.

BRIEF DESCRIPTION OF THE DRAWINGS

Other features and advantages of the invention will become more apparent from the following description when taken in conjunction with the accompanying drawings in which.

In the drawings, the same reference numerals represent the same structural elements.

DESCRIPTION OF THE PREFERRED EMBODIMENTS OF THE INVENTION

Figure 3:
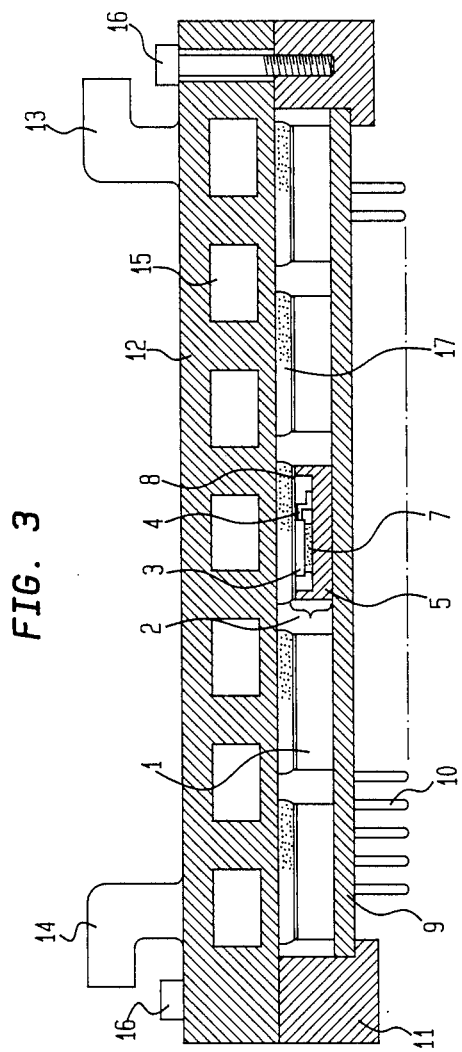
FIG. 3 is a cross-sectional view of a first embodiment of the invention.
Figure 4:
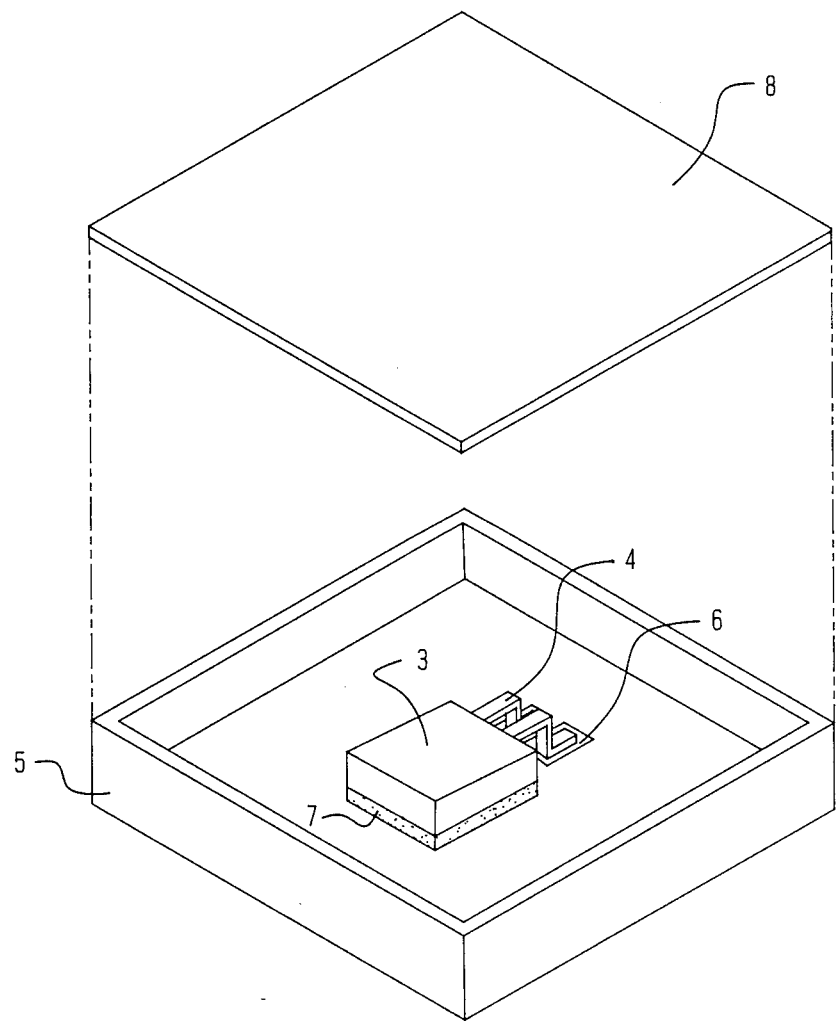
FIG. 4 is a perspective view of a temperature sensing block used in the embodiment of FIG. 1.

Referring to FIG. 3, a first embodiment of the invention comprises IC chips 1 and a temperature sensing block 2. Each of the IC chips 1 is mounted on a chip carrier. As shown in FIG. 4, the block 2 is made up of a temperature sensor 3 having leads 4, a case 5 and pads 6 fitted on the case 5 to which the leads 4 are soldered individually. The temperature sensor 3 is mounted on the case 5 with the intermediary of a cushioning member 7. A cap 8 is mounted on the case 5 from above the temperature sensor 3. The temperature sensor 3 is adhered to the cap 8 by a thermoconductive adhesive. A printed circuit board 9 mounts the plurality of IC chips 1 and the single temperature sensing block 2 thereon. A number of input and output pins 10 extend out from the surface of the circuit board 9 opposite to the surface on which the IC chips 1 are mounted, implementing signal connection to the outside and power supply. A frame 11 is rigidly connected to the printed circuit board 9 so as to surround the latter.

A cooling plate 12 has an inlet 13, and outlet 14 and a path 15 through which a coolant is circulated. The plate 12 is fastened to the frame 11 by screws 16 to face the upper ends of the IC chips 1 with at a short distance from the latter. The clearances between the plate 12 and the IC chips 1 are filled up by a thermoconductive compound 17 in the form of a paste. While the embodiment is implemented by a liquid cooling system, the liquid cooling system may be replaced with an air cooling system, in which case the plate 12 will be replaced with a heat sink having fins, for example.

Heat generated by the IC chips 1 is transferred to the plate 12 by the thermoconductive compound 17 and therefrom to a liquid coolant which is flowing through the path 15 of the plate 12. The temperature of that surface of the plate 12 which faces the IC chips 1 differs from the temperature of the P-N junction of each chip 1 by a certain constant amount. Hence, only if such a temperature difference is determined either by calculation or by experiment, it is possible to compute the temperature of the P-N junctions of the chips 1 by measuring the temperature of the above-mentioned surface of the plate 12.

The case 5 of the temperature sensing block 2 is so designed as to have almost the same height as the IC chips 1. The clearance between the upper end of the case 5 and the plate 12 is also filled with a thermoconductive compound. The temperature sensor 3 is adhered to the cap 8 by a thermoconductive adhesive, as stated earlier. In this configuration, the temperature sensor 3 is capable of measuring the temperature of that surface of the plate 12 which faces the IC chips 1, if the IC package is thermally in equilibrium. The output of the temperature sensor 3 is coupled to the printed circuit board 9 via the case 5 and therefrom to an external circuit via the pins 10. The external circuit is constructed to interrupt the power supply to the IC chips 1 when the temperature sensor 3 detects a temperature of the above-mentioned surface of the plate 12 associated with the maximum allowable temperature of the P-N junctions of the IC chips 1. This is successful in protecting the IC chips against damage.

Since the output of the temperature detector 2 is led to the outside by the pins 10 in the same manner as the outputs of the IC chips 1, the need for a separate connector or the like for temperature detection is eliminated. The IC package, therefore, can be mounted and dismounted without any consideration to the connection of the temperature sensor output. The IC package does not have any protuberance and is, therefore, free from damage which has been described in relation to the prior art.

Figure 1:
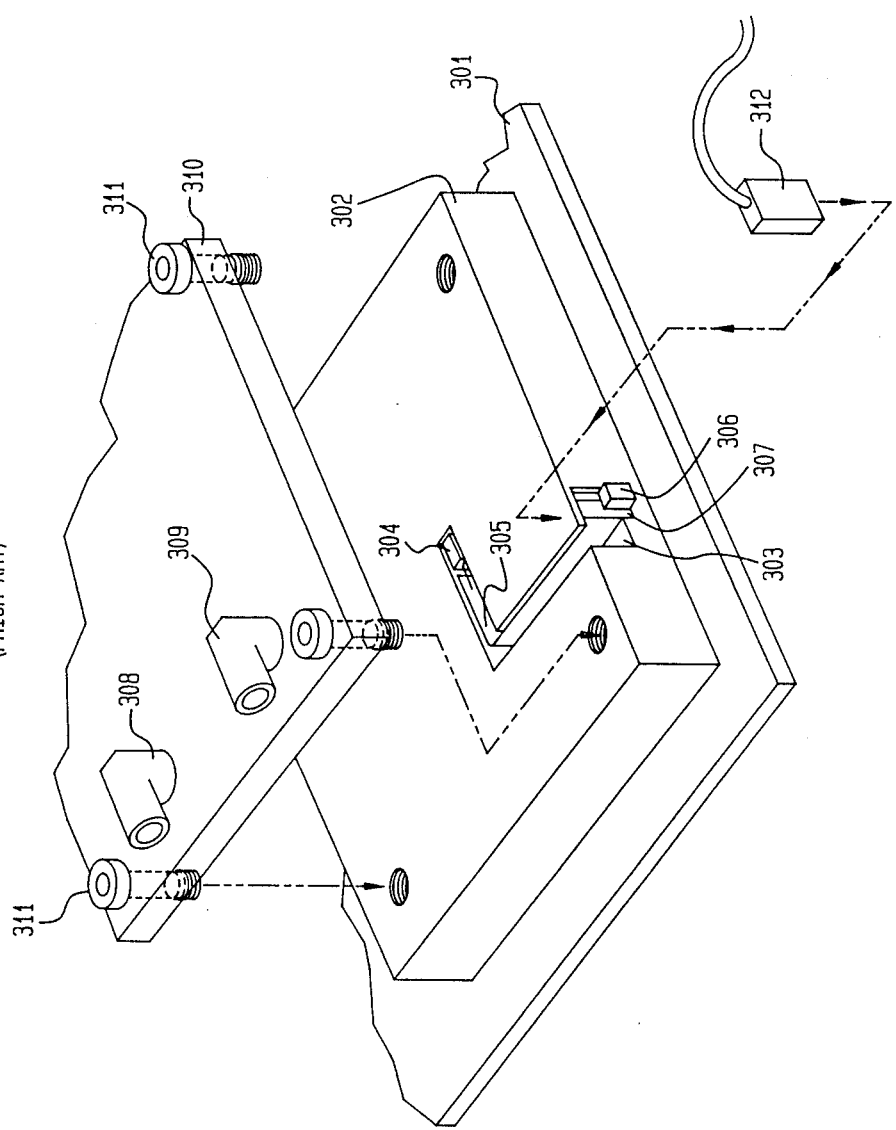
FIG. 1 is an exploded perspective view of a prior art structure for sensing the temperature of a package.
Figure 2:
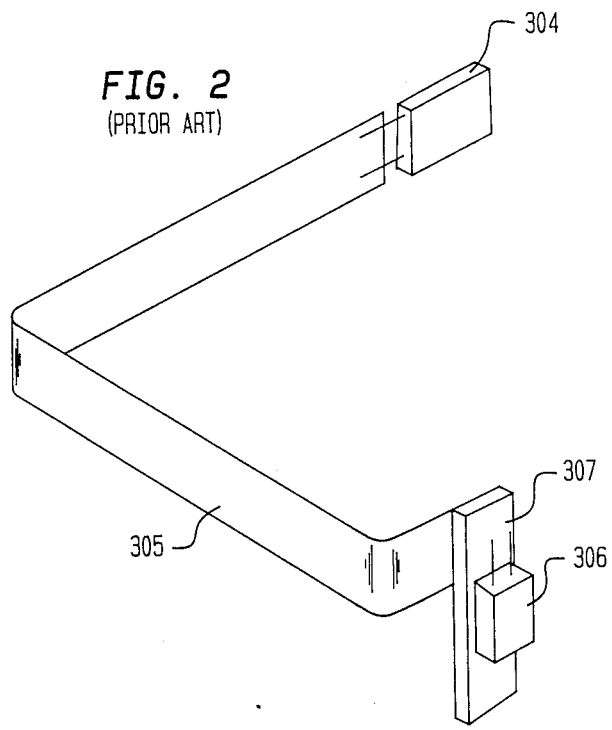
FIG. 2 is a fragmentary perspective view for showing a part of the structure of FIG. 1 in an enlarged scale.
Figure 6:
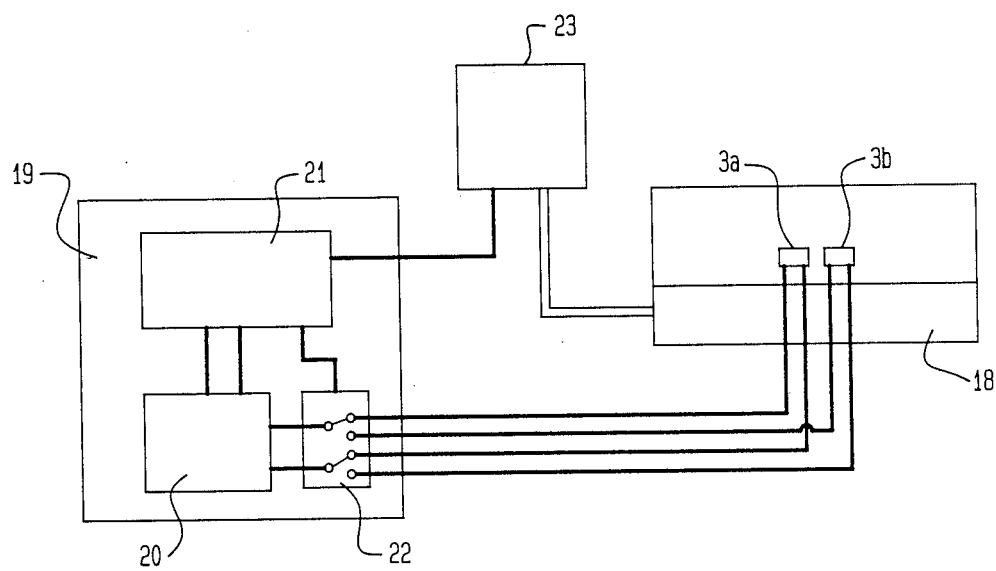
FIG. 6 is a block diagram for showing temperature sensing circuitry used in the embodiment of FIG. 5.
Figure 5:
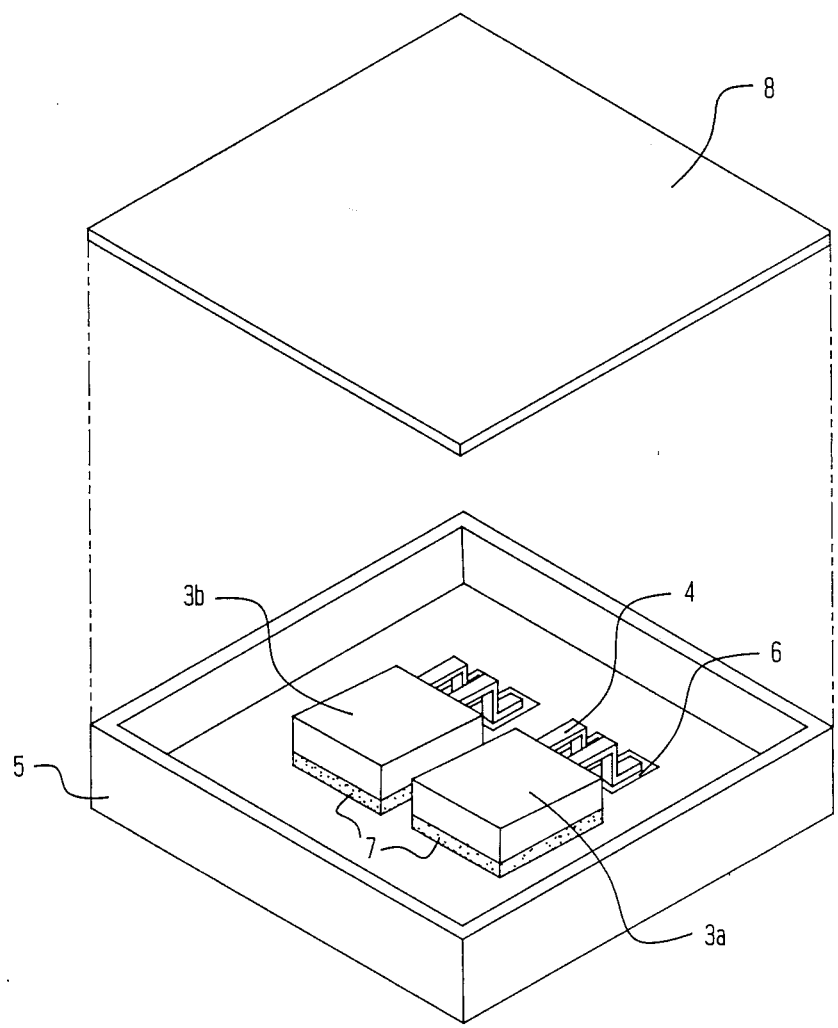
FIG. 5 is a perspective view of a second embodiment of the invention.

Referring to FIG. 5, a second embodiment of the invention is shown. In the structure shown in FIG. 5, the temperature sensing block 2 has a pair of temperature sensors 3a and 3b so that a temperature detecting function may be insured even when one of them fails. Specifically, the leads 4 of the temperature sensors 3a and 3b are individually soldered to the pads 6 of the case 5, while the cushioning members 7 are interposed between the individual temperature sensors 3a and 3b and the case 5. The cap 8 is mounted on the case 5 from above the temperature sensors 3a and 3b. As shown in FIG. 6, the outputs of the temperature sensors 3a and 3b are connected to the printed circuit board 9 via the case 5 and further to an external circuit 19 via the pins 10 and a connector 18. The external circuit 19 is constructed such that the power supply to the IC chips 1 is interrupted when the temperature of a portion of that surface of the plate 12 which faces the IC chips 1 exceeds a predetermined temperature associated with the maximum allowable temperature of the P-N junctions of the chips 1, which is detected by the corresponding one of the sensors 3a and 3b. Such a construction is also successful in safeguarding the IC chips 1 from damage.

The external circuit 19 has a temperature detecting section 20 and a control section 21. Assume that the external circuit 19 usually maintains the temperature sensor 3a active. When the temperature sensor 3a fails, for instance, when it senses a temperature which an IC package will never reach under normal conditions of use, the control section 21 operates a switching circuit 22 to activate the other temperature sensor 3b. In this manner, when a malfunction occurs in one of the two temperature sensors, its temperature sensing function is handed over to the other temperature sensor to thereby enhance reliability of the temperature detecting circuitry. Hence, it does not occur that, despite that IC chips are normally operable, the entire IC package has to be replaced due to the failure of a temperature sensor.

What is claimed is:

1. A structure for detecting a temperature of a package, comprising:
    a circuit board having mounted thereon a plurality of integrated circuit chips, each of said integrated circuit chips being accommodated in respective chip carriers;
    a cooling plate facing said integrated circuit chips at a predetermined distance from said integrated circuit chips for performing a heat exchange with a coolant;
    a temperature sensing block for measuring the temperature of a surface of said cooling plate which faces said integrated circuit chips, including a case which is mounted on said circuit board and has substantially the same height as the chip carriers, and at least one temperature sensor accommodated in said case; and
    a heat-conducting medium filling gaps defined between said cooling plate and said integrated circuit chips and between said cooling plate and said temperature sensing block.

2. The structure as claimed in claim 1, wherein a plurality of temperature sensors are accommodated in said case.

3. The structure as claimed in claim 2, further comprising an external circuit for controlling said temperature sensors such that when one of said temperature sensors senses a temperature indicative of a malfunction of said one of said temperature sensors, said external circuit activates another of said temperature sensors for temperature sensing.

4. The structure as claimed in claim 1, wherein said case isolates said temperature sensor from atmospheric variations occurring externally of said case and couples said temperature sensor to said printed circuit board; and said case comprises a bottom, sides, and a cap adhered to said at least one temperature sensor by a thermoconductive adhesive, and adapted to enclose said temperature sensor in the case.

5. The structure as claimed in claim 4, wherein said case further comprises:
    at least one cushioning member provided between said temperature sensor and the bottom of the case;
    at least one pad provided on the bottom of the case; and
    leads extending between said temperature sensor and said pad.

* * * * *